United States Patent [19]
Birkhofer et al.

[11] Patent Number: 5,352,729
[45] Date of Patent: Oct. 4, 1994

[54] USE OF PIGMENT FORMULATIONS FOR THE PREPARATION OF PASTES, PRINTING INKS AND COATINGS

[75] Inventors: Hermann Birkhofer, Ludwigshafen; Walter Denzinger, Speyer; Heinrich Hartmann, Limburgerhof; Juan A. G. Gomez, Muenster; Paul Guenthert, Schifferstadt; Joachim Jesse, Weisenheim; Robert Kreuzer, Ludwigshafen; Knut Oppenlaender, Ludwigshafen; Reinhard U. Roth, Ludwigshafen; Benno Sens, Netphen, all of Fed. Rep. of Germany

[73] Assignee: BASF Aktiengesellschaft, Ludwigshafen, Fed. Rep. of Germany

[21] Appl. No.: 973,986

[22] Filed: Nov. 9, 1992

[30] Foreign Application Priority Data

Nov. 14, 1991 [DE] Fed. Rep. of Germany ..... 4137476

[51] Int. Cl.$^5$ ............ C08L 35/08; C08L 33/02; C08L 23/20; C08L 23/24
[52] U.S. Cl. ............ 524/549; 524/556; 523/200; 523/205; 428/407
[58] Field of Search ............ 524/556, 549; 523/205, 523/200; 428/407

[56] References Cited

U.S. PATENT DOCUMENTS

| | | | |
|---|---|---|---|
| 3,249,455 | 5/1966 | Williams | 524/549 |
| 3,262,898 | 7/1966 | Williams | 524/549 |
| 3,991,032 | 11/1976 | Pace | 524/549 |
| 4,166,811 | 9/1979 | Marr et al. | 524/556 |
| 4,396,734 | 8/1983 | Williams et al. | 524/556 |
| 4,598,118 | 7/1986 | Hansen et al. | 524/549 |

FOREIGN PATENT DOCUMENTS

| | | |
|---|---|---|
| 0033213 | 8/1981 | European Pat. Off. . |
| 0058865 | 9/1982 | European Pat. Off. . |
| 189385 | 7/1986 | European Pat. Off. . |
| 0412389 | 2/1991 | European Pat. Off. . |
| 2162484 | 6/1972 | Fed. Rep. of Germany . |
| 3803810 | 8/1989 | Fed. Rep. of Germany . |
| 3926167 | 2/1991 | Fed. Rep. of Germany . |
| 3926168 | 2/1991 | Fed. Rep. of Germany . |
| 4156706 | 12/1979 | Japan .......... 524/556 |
| 1155550 | 6/1969 | United Kingdom . |
| 2026006 | 1/1980 | United Kingdom . |

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

Pigment formulations containing
(a) at least one finely divided pigment,
(b) at least one copolymer obtainable by free radical polymerization of
 ($\alpha_1$) $C_8$–$C_{40}$-monoolefins or
 ($\alpha_2$) $C_8$–$C_{40}$-alkyl vinyl ethers or
 ($\alpha_3$) a mixture of $C_8$–$C_{40}$-alkyl vinyl ethers and up to 50 mol % of $C_8$–$C_{40}$-monoolefins with
 ($\beta$) monoethylenically unsaturated $C_4$–$C_{12}$-dicarboxylic acids or $C_4$–$C_{12}$-dicarboxylic anhydrides
and having a molecular weight of from 500 to 20,000 g/mol, some or all of whose carboxyl or anhydride groups may be reacted with ammonia, amines, alcohols, amino- or hydroxycarboxylic acids or alkali metal or alkaline earth metal hydroxides, and
(c) if required, further assistants conventionally used in pigment formulations
are used for the preparation of pastes, printing inks and coatings.

4 Claims, No Drawings

USE OF PIGMENT FORMULATIONS FOR THE PREPARATION OF PASTES, PRINTING INKS AND COATINGS

The present invention relates to the use of pigment formulations containing
- (a) at least one finely divided pigment,
- (b) at least one copolymer obtainable by free radical polymerization of
  - ($\alpha_1$) $C_8$–$C_{40}$-monoolefins or
  - ($\alpha_2$) $Cs_8$–$C_{40}$-alkyl vinyl ethers or
  - ($\alpha_3$) a mixture of $C_8$–$C_{40}$-alkyl vinyl ethers and up to 50 mol % of $C_8$–$C_{40}$-monoolefins with
  - ($\beta$) monoethylenically unsaturated $C_4$–$C_{12}$-dicarboxylic acids or $C_4$–$C_{12}$-dicarboxylic anhydrides and having a molecular weight of from 500 to 20,000 g/mol, some or all of whose carboxyl or anhydride groups may be reacted with ammonia, amines, alcohols, amino- or hydroxycarboxylic acids or alkali metal or alkaline earth metal hydroxides, and
- (c) if required, further assistants conventionally used in pigment formulations for the preparation of pastes, printing inks and coatings, and to pastes, printing inks and coatings which contain these pigment formulations.

The present invention furthermore relates to novel pigment formulations.

In the preparation of printing inks, the pigments are increasingly being ground at higher concentrations. Stock pastes, i.e. dispersions of pigments in mineral oil, toluene and/or other solvents which have a low binder content or are even binder-free and possess high pigment concentrations are being prepared to an increasing extent. The pastes are then ground with the binders and/or concentrated binder solutions to give printing inks. For grinding at high concentrations, the flow behavior of the printing inks or stock pastes must meet high requirements. The higher the pigment concentration during grinding, the lesser the extent to which the requirements are met when the organic colored pigments most frequently used in printing inks are employed, such as C.I. Pigment Blue 15, C.I. Pigment Red 57 and C.I. Pigment Yellow 12 and 13.

However, it is known that, by coating the pigments with surfactants, it is possible to prepare pigment formulations which can be processed to give printing inks having better flow properties or to give pastes having a high pigment concentration which are still pumpable.

DE-A-21 62 484 describes dispersants based on polyester of hydroxycarboxylic acids, in particular hydroxystearic acids.

EP-A-189 385 discloses mixtures of a dipolyesteramide, likewise preferably based on hydroxystearic acids, with smaller amounts of a salt of a carboxylic acid with a diamine and of a free carboxylic acid or of a free diamine as a dispersant, whose flow-improving effect can be increased by further additives, such as colorant derivatives.

However, the efficiency of these agents is not sufficient in all cases, and the addition of larger amounts of the colorless assistants would lead to a decrease in the color strength of the printing inks, coatings and pastes prepared.

Furthermore, DE-A-38 03 810 describes pigment preparations which contain copolymers of $\alpha$-olefins and esters of $\alpha,\beta$-unsaturated dicarboxylic acids for reducing the viscosity and are used for pigmenting, in particular, polyurethane plastics.

It is an object of the present invention to provide effective additives which permit economical preparation of printing inks and coatings having good flow and pumpable pastes, and the use of which does not lead to any significant reduction in the color strength of the products.

We have found that this object is achieved by the use of the pigment formulations defined at the outset for the preparation of pastes, printing inks and coatings.

We have furthermore found novel pigment formulations which contain
- (a) at least one finely divided pigment,
- (b') at least one copolymer obtainable by free radical polymerization of
  - ($\alpha_1'$) $C_{18}$–$C_{40}$-monoolefins or
  - ($\alpha_2$) $C_8$–$C_{40}$-alkyl vinyl ethers or
  - ($\alpha_3$) a mixture of $C_8$–$C_{40}$-alkyl vinyl ethers and up to 50 mol % of $C_8$–$C_{40}$-monoolefins with
  - ($\beta$) monoethylenically unsaturated $C_4$–$C_{12}$-dicarboxylic acids or $C_4$–$C_{12}$-dicarboxylic anhydrides and having a molecular weight of 500 to 12,000 g/mol, some or all of whose carboxyl or anhydride groups may be reacted with ammonia, amines, alcohols, amino- or hydroxycarboxylic acids or alkali metal or alkaline earth metal hydroxidees, and
- (c) if required, further assistants conventionally used for pigment formulations.

Preferred components (a) of the pigment formulations according to the invention or to be used according to the invention are the pigments usually used for printing inks. Specific examples are:

phthalocyanine pigments, especially copper phthalocyanines, preferably C.I. Pigment Blue 15;

diaryl yellow pigments, such as C.I. Pigment Yellow 17, 83, 126, 127 and 174, preferably C.I. Pigment Yellow 12, 13, 17 and 81;

laked BON acid pigments, such as C.I. Pigment 52 and prefeably 57;

$\beta$-naphthol pigments, such as C.I. Pigment Orange 5; disazopyrazolone pigments, such as C-I. Pigment Orange 13 and 34 and C.I. Pigment Red 37 and 41;

naphthol AS pigments, such as C.I. Pigment Blue 25.

The copolymers which are employed as component (b) in the pigment formulations to be used according to the invention and which comprise ($\alpha_1$) $C_8$–$C_{40}$-monoolefins or ($\alpha$) $C_8$–$C_{40}$-alkyl vinyl ethers or ($\alpha_3$) a mixture of $C_8$–$C_{40}$ -alkyl vinyl ethers with up to 50 mol % of $C_8$–$C_{40}$-monoolefins and ($\beta$) monoethylenically unsaturated $C_4$–$C_{12}$-dicarboxylic acids or $C_4$–$C_{12}$-dicarboxylic anhydrides are disclosed, for example in DE-A-39 26 167 and 39 26 168, as water repellant agents for leather and skins or obtainable by the methods described there.

The average molecular weight of the copolymers (b) is, as a rule, from 500 to 20,000, preferably from 500 to 12,000, particularly preferably from 1,000 to 10,000, g/mol.

Suitable monoolefins ($\alpha_1$) are as a rule of 8 to 40, preferably 18 to 40, particularly preferably 20 to 30, carbon atoms. They may be linear, branched or cyclic (e.g. cyclooctene). Linear $\alpha$-olefins are particularly preferred.

Examples of monoolefins ($\alpha_1$) are n-oct-1-ene, 2,4,4-trimethylpent-1-ene, 2,4,4-trimethylpent-2-ene, diisobutene (industrial isomer mixture of about 80% of 2,4,4- trimethylpent-1-ene and about 20% of 2,4,4-trimethylpent-2-ene), 4,4-dimethylhex-1-ene, dec-1-ene, dodec-1-ene, tetradec-1-ene, hexadec-1-ene, octadec-1-ene, 1-$C_{20}$-olefin, 1-$C_{22}$-olefin, 1-$C_{24}$-olefin, 1-$C_{30}$-olefin, 1-$C_{36}$-olefin and 1-$C_{40}$-olefin and the mixtures 1-$C_{12}$-olefin to 1-$C_{14}$-olefin, 1-$C_{20}$-olefin to 1-$C_{24}$-olefin and 1-$C_{24}$-olefin to 1-$C_{28}$-olefin.

The olefins ($\alpha_1$) are commercial products which may contain small amounts (up to about 5% by weight) of inert organic hydrocarbons from the preparation. However, they can be used directly for polymerization, without further purification, Suitable alkyl vinyl ethers ($\alpha_2$) are as a rule of 8 to 40, preferably 16 to 30, carbon atoms. They may be linear, branched or cyclic.

Examples of alkyl vinyl ethers ($\alpha_2$) are n-octyl vinyl ether, 2-ethylhexyl vinyl ether, 2,2,4-trimethylpentyl vinyl ether, n-decyl vinyl ether, n-dodecyl vinyl ether, isododecyl vinyl ether, n-tridecyl vinyl ether, isotridecyl vinyl ether, tetradecyl vinyl ether, hexadecyl vinyl ether, octadecyl vinyl ether, eicosyl vinyl ether, docosyl vinyl ether, tetracosyl vinyl ether, hexacosyl vinyl ether, octacosyl vinyl ether, oleyl vinyl ether and cyclooctyl vinyl ether and mixtures thereof.

The alkyl vinyl ethers ($\alpha_2$) may also contain up to 50 mol % of monoolefins ($\alpha_1$). An example of such a component ($\alpha_3$) is a mixture of n-octadecyl vinyl ether with 25 mol % of n-octadec-1-ene.

Suitable monoethylenically unsaturated dicarboxylic acids or dicarboxylic anhydrides ($\beta$) are as a rule of 4 to 12, preferably 4 or 5, carbon atoms. The dicarboxylic anhydrides are preferably used for the copolymerization. Examples are maleic acid, fumaric acid, methylenemalonic acid, glutaconic acid, itaconic acid, mesaconic acid and citraconic acid and mixtures thereof, as well as the corresponding anhydrides and mixtures thereof. Maleic anhydride is very particularly preferred.

The novel pigment formulations contain copolymers (b') having average molecular weights of, as a rule, from 500 to 12,000, preferably from 1,000 to 10,000, g/mol.

The monoolefins ($\alpha_1'$) used are as a rule of 18 to 40, preferably 20 to 30, carbon atoms and are preferably linear $\alpha$-olefins. Examples are octadec-1-eene and especially 1-$C_{20}$-olefin, 1-$C_{22}$-olefin, 1-$C_{24}$-olefin, 1-$C_{30}$-olefin, 1-$C_{36}$-olefin, 1-$C_{40}$-olefin and especially the mixtures 1-$C_{20}$-olefin to 1-$C_{24}$-olefin and 1-$C_{24}$-olefin to 1-$C_{28}$-olefin.

The further components ($\alpha_2$), ($\alpha_3$) and ($\beta$) correspond to those of the pigment formulations to be used according to the invention.

The copolymers (b) of both the novel pigment formulations and the pigment formulations to be used according to the invention contain, as a rule, from 40 to 60 mol % of monoolefins ($\alpha_1'$) or ($\alpha_1$), alkyl vinyl ether ($\alpha_2$) or a mixture thereof ($\alpha_3$) and from 60 to 40 mol % of dicarboxylic acids or anhydrides thereof ($\beta$).

In both cases, copolymers (b) of monoolefins ($\alpha_1$) or ($\alpha_1'$) with ($\beta$) are preferred. Among these, those with maleic anhydride as component ($\beta$) are particularly preferred.

As described in DE-A-39 26 167 and 39 26 168, they can be prepared by all known conventional polymerization processes, for example by suspension, precipitation, solution and particularly preferably mass polymerization.

The monomers ($\alpha$) and ($\beta$) are usually used in a molar ratio of from 1.1:1 to 1:1. The monomers are preferably polymerized in a molar ratio of 1:1, or an excess of only about 1% by weight of monomers (e) is used.

The copolymerization is preferably carried out in the presence of conventionally used compounds which form free radicals, as a rule from 0.01 to 10, preferably from 0.2 to 5, % by weight, based on the monomers used, of said compounds being added.

The reaction temperature is as a rule from 80 to 300° C., preferably from 120° to 200° C., the lowest polymerization temperature to be chosen preferably being at least 20° C. above the glass transition temperature of the polymer formed.

The copolymerization is advantageously carried out in the absence of oxygen, preferably in a stream of nitrogen.

The copolymers (b) thus obtained can be used directly in the novel pigment formulations. However, it is also possible for some or all of their carboxyl or anhydride groups to be first amidated and/or esterified and/or neutralized or hydrolyzed. In this case, up to about 50% of these groups are preferably reacted.

The necessary reaction of the copolymers with ammonia, the corresponding amines, alcohols or amino- or hydroxycarboxylic acids can be carried out either in the absence of a solvent or in an inert solvent, such as xylene, toluene or dioxane, at from 20° to 150° C., preferably from 40° to 100° C.; the reaction is advantageously effected in the absence of water or the resulting water of reaction is removed.

The neutralization or hydrolysis is preferably carried out by adding an aqueous solution or suspension of an alkali metal or alkaline earth metal hydroxide, especially sodium hydroxide or potassium hydroxide, magnesia hydroxide, calcium hydroxide or barium hydroxide.

Ammonia and primary and secondary amines of, as a rule, 1 to 40, preferably 3 to 30, carbon atoms may be used for amide formation. For example, the following are suitable:

saturated and unsaturated aliphatic and cycloaliphatic amines, such as methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine and oleylamine, as well as dimethylamine, diethylamine, di-n-propylamine, diisopropylamine, di-n-butylamine, diisobutylamine, dihexylamine, dicyclohexylamine, N-methylcyclohexylamine, N,N-bis(methylcyclohexyl)amine, di-2-ethylhexylamine, di-n-octylamine, diisotridecylamine, ditallow fatty amine, distearylamine and dioleylamine;

aromatic amines, such as aniline, naphthylamine, o-, m- and p-toluidine and 2-phenylethylamine and N-ethyl-o-toluidine;

di- and oligoamines, such as ethylenediamine, 1,3-diaminopropane, hexamethylenediamine, dipropylenediamine, 2-diethylaminoethylamine, 3-diethylaminopropylamine and 3,3'-dimethyl-4,4'-diaminophenylmethane, as well as diethyltriamine, dipropyltriamine, bishexamethylenetriamine and N-tallow fatty 1,3-diaminopropane; alcohol amines, such as ethanolamine and n-propanolamine, as well as diethanolamine and di-n-propanolamine;

ether amines and polyether amines, such as morpholine, 4,9-dioxadodecane-1,12-diamine, 4,7,10-trioxatridecane-1,13-diamine and bis-(3-aminopropyl)-polytetrahydrofuran.

The esterification of the carboxyl or anhydride groups can be carried out using primary, secondary and tertiary alcohols, each of which is of 1 to 40, preferably 3 to 30, carbon atoms. Examples of suitable alcohols are:

saturated and unsaturated aliphatic and cycloaliphatic alcohols, such as methanol, ethanol, n-propanol, isopropanol, n-butanol, isobutanol and n-pentanol, n-hexanol, n-octanol, n-nonanol, n-decanol, n-dodecanol, n-tridecanol and isomers thereof (e.g. 2-ethylhexanol), cyclohexanol, tallow fatty alcohol, stearyl alcohol and oleyl alcohol, the alcohols and alcohol mixtures of 9 to 19 carbon atoms which are industrially readily obtainable by oxo synthesis, such as $C_9/C_{11}$ oxo alcohol and $C_{13}/C_{15}$ oxo alcohol, and Ziegler alcohols of 12 to 24 carbon atoms, which are known under the name Alfol® (Condea);

aromatic alcohols, such as alkylphenols, bisphenol A and ethoxylated alkylphenols;

di-, oligo- and polyols, such as ethylene glycol, 1,10-decanediol, 2-ethyl-2-hydroxmethyl-1,3-propanediol, glycerol, pentaerythritol, sorbitol and glucose;

ether alcohols and polyetherdiols, such as ethylene glycol monoethyl ether, ethylene glycol monobutyl ether, di- and triethylene glycol monoethyl ether and di- and triethylene glycol monobutyl ether, polytetrahydrofuran and polyethylene glycols and polypropylene glycols, which are known under the name Pluriol® (BASF).

Furthermore, the carboxyl and anhydride groups of the polymers, preferably up to about 50% of said groups, may also be reacted with amino- or hydroxycarboxylic acids, each of which is as a rule of 2 to 18, preferably 3 to 12, carbon atoms. Examples of such acids are N-methylglycine, alanine, 2-Phenyl-2-aminobutyric acid, anthranilic acid, 11-amninoundecanoic acid, ethanolaminoacetic acid and iminodiacetic acid, as well as lactic acid, hydroxypivalic acid, glycolic acid, 4-hydroxybutyric acid, 5-hydroxyvaleric acid and 12-hydroxystearic acid.

The copolymers (b) are present in the novel pigment formulations in amounts of in general from 1 to 30, preferably from 2 to 20, % by weight, based on the pigments (a).

Suitable further agents (c) conventionally used in pigment formulations are, for example, colorant derivatives which have one or more acidic groups, such as carboxylic or sulfo and/or carboxamido or sulfonamido groups, and can be used in the novel pigment formulations in amounts, as a rule, of from 1 to 20, preferably from 1 to 10, % by weight, based on (a). Together with the copolymers (b), these derivatives have a synergistic action, which can be enhanced in some cases by adding amines or polyamines as further additives (as a rule from 1 to 20, preferably from 2 to 10, % by weight, based on (a)). Preferred colorant derivatives (c) are the amine salts of acidic derivatives of pigments (a).

Examples of suitable colorant derivatives (c) in the case of the azo pigments C.I. Pigment Yellow 12 and 13 are in particular mixed coupling products of 1,4-diaminodichlorobiphenyl with acetoacetanilide, -m-xylidide or o-toluidide and acetoacetsulfanilic acid or sulfophenylpyrazol-5-one and the coupling product of flavonic acid with 2 mol of acetoacet-m-xylidide.

In the case of copper phthalocyanine (CuPc) C.I. Pigment Blue 15, CuPc-sulfonic acids having from 1 to 4, preferably 1 or 2, sulfo groups, as well as CuPc derivatives having from 1 to 4 sulfonamido groups and those having sulfo and sulfonamido groups, are particularly suitable.

The novel pigment formulations furthermore contain, as agents (c), conventional surfactants which serve for improving the wetting and/or the distribution of the pigments. Examples of such agents are resins, resin acids and salts thereof, sulfated natural oils, such as Turkey red oil, abietic acid, abiethylamine, resinates, rosin and modifications thereof. The amount of these may be up to 50% by weight, based on the pigments (a).

The agents (c) and their use are part of the prior art and are familiar to the skilled worker.

For the preparation of the novel pigment formulations, the pigments (a) can be coated with (b) and, if required, (c) directly in the suspension obtained in the synthesis or during finishing and can then be isolated by conventional filtration. However, the pigments are preferably coated after finishing.

For this purpose, the pigments (a) in the dry state can be mechanically mixed with (b) and, if required, (c). Particularly in the preparation of pastes, the pigments (a) can, however, also be ground with (b) and, if required, (c) directly in the particular organic liquids used, which may contain printing ink binders, examples of said organic liquids being mineral oils, aromatic, aliphatic and cycloaliphatic hydrocarbons, alcohols, esters, ketones and mixtures thereof. The pastes may then be further processed in a conventional manner to give printing inks or coatings.

Compared with the uncoated pigments, the novel pigment formulations have substantially improved coloristic, rheological and printing properties.

The combination of good flow behavior of the pastes and printing inks prepared using these pigment formulations and high transparency and high gloss of the prints to be obtained is particularly advantageous.

EXAMPLES

A. Preparation and testing of mineral oil pastes and printing inks

Mineral oil pastes and printing inks were prepared as described below using the pigment formulations of Examples 1 to 17 and were then tested.

1. Mineral oil pastes 1.1 Preparation

EXAMPLES 1 TO 16

The copolymer (b) was first dissolved in mineral oil PKWF 6/9 (Haltermann, Hamburg), if necessary while heating in a water bath, and the pigment was then added. After thorough mixing with a spatula, the paste was homogenized on a Bühler roll mill SDY 200 without pressure (1st and 2nd roll) and was then taken up at a pressure of from 3 to 5 bar via the take-off roll.

EXAMPLE 17

The pigment already coated with the copolymer (b) was processed to give a mineral oil paste, similarly to Examples 1 to 16.

The particular compositions of the pastes thus prepared are stated in the Examples.

1.2 Evaluation of the rheological properties 0.25 g of the mineral oil paste prepared according to 1.1 was placed between two glass sheets (microscope slides 52×76×1 mm) and was loaded with increasing weights (31.25 g, 62.5 g, 125 g, 250 g, 500 g, 1000 g) for 60 seconds in each case. After each loading, the diameter of the paste circle was measured and was stated in millimeters (circle method).

2. Offset printing inks

2.1 Preparation

The mineral oil pastes prepared according to 1.1. were diluted with a varnish of 43 parts of an acrylic acid-modified rosin (Alresat® SKA 932, from Albert, Wiesbaden) and 37 parts of a varnish linseed oil to the particular pigment concentration stated in the Examples and were then predispersed for 10 minutes at 70° C. using a Dispermat dissolver (toothed disk, 3 cm diameter, 1200 rpm). The ink was then ground three times at a roll pressure of 10 bar on the Bühler roll mill SDY 200 thermostated at 35° C.

2.2 Determination of the transparency

The offset ink prepared according to 2.1 was diluted to 10% pigment content with a solution of an alkyd resin based on dry vegetable fatty acids, glycerol and phthalic acid anhydride (Alkydal® F 681, 75% strength in gasoline, from Bayer) under a load of 25 kg in a disk mill (from Engelsmann) and mixing was carried out. The mixture was applied in a layer thickness of 100 μm to contrast cardboard (black/white) using an Erichsen film caster, 8 drops of drying agent Octa Soligen cobalt 1.7%), lead (15.7%) liquid (from Hoechst) being mixed with the ink on the grinding disk immediately before application. The transparency was rated visually.

2.3 Evaluation of the flow behavior

The flow behavior of the offset printing inks was determined by the flow sheet method. For the production of a flow sheet, a well-like depression of 10 mm was made in a 25×6 cm deep drawn sheet with the aid of an Erichsen deep-drawing apparatus. The midpoint of this indentation corresponds to rating 1. Marks were made at 40 mm intervals along the edge of the sheet and correspond to ratings 2 to 5.

3 g samples of the offset ink to be tested were weighed into the indentation of the sheet lying in a horizontal position. After storage for 30 minutes, the sheet was suspended vertically in a conditioned room so that the ink could flow downward. Printing inks which did not flow received rating 1. Flowing printing inks were rated after a running time of 15, 30 and 60 minutes. Systems which tended to exhibit thixotropy during storage were suspended vertically directly after the printing ink had been weighed in. In these cases, the time taken to reach the individual ratings was measured (max. 30 minutes running time).

B. Embodiments

1. Preparation of the copolymers (b)

The molecular weight of the copolymers was determined in each case by gel permeation chromatography, tetrahydrofuran serving as the eluant and a polystyrene fraction having a narrow distribution being used for calibration.

Copolymer 1

In a stainless steel reactor equipped for polymerization (stirrer and metering apparatus), 1,195 g of a 1-$C_{20}$- to 1-$C_{24}$-olefin mixture (Gulftene 20-24, commercial product from Gulf Oil Chemical Company, USA) were heated to 190° C. in a gentle stream of nitrogen while stirring. As soon as this temperature had been reached, 392 g of maleic anhydride (MA) heated to 70° C. and, separately from this, 16 g of di-tert-butyl peroxide were added at a constant rate in the space of 4 hours. The reaction mixture was then stirred for a further 2 hours at 190° C.

The average molecular weight of the resulting copolymer was 8,900 g/mol.

Copolymer 1a

A solution of 100 g of copolymer 1 in 200 g of xylene was added dropwise to 27.8 g of an imidazoline of a tallow fatty acid and diethylene triamine (amine number 3.8 mol of basic N/g) at 120° C. and 460 mbar in the course of 4 hours. Stirring was then continued for a further 6 hours at this temperature.

The product was isolated by distilling off xylene under reduced pressure.

Copolymer 1b

Copolymer 1 was reacted with twice the amount of the tallow fatty acid aminoethylimidazoline, similarly to the preparation of copolymer 1a.

Copolymer 1c 83 g of isotridecanol were added dropwise to a solution of 360 g of copolymer 1 in 250 ml of xylene at 130° C. Stirring was then continued for 8 hours at 130° C.

The product was isolated by distilling off xylene under reduced pressure. The acid number was 80 mg KOH/g.

Copolymer 1d 21.4 g of ethyl-1-naphthylamine were added dropwise to a solution of 216 g of copolymer 1 in 100 ml of xylene at 100° C. The mixture was then stirred for 7 hours at 140° C.

The product was isolated by distilling off xylene under reduced pressure. The acid number was 83 mg KOH/g.

Copolymer 1e

A mixture of 150 g of copolymer 1 and 3.2 g of piperazine were stirred for 4 hours at 120° C., after which the acid number was 120 mg KOH/g. 200 ml of dioxane and 50 ml of water were then added. Thereafter, stirring was continued for 4 hours at 100° C.

The product was isolated by distilling off the solvent at 15 mbar.

Copolymer 1f 15.8 g of lactic acid were added to 320 g of copolymer 1 at 90° C. while stirring. After stirring had been carried out for 10 hours at 90° C., 21.4 g of 2-ethyl-2-hydroxymethyl-1,3-propanediol were added. Stirring was then continued for about 10 hours at this temperature, after which the acid number was 150 mg KOH/g.

Copolymer 1g

A solution of 150 g of copolymer 1 and 11.7 g of a tallow fatty 1,3-diaminopropane in 300 ml of xylene was stirred for 4 hours at 80° C.

The product was isolated by distilling off xylene under reduced pressure. The acid number was 28 mg KOH/g.

Copolymer 1h 972 g of imidazoline of a tallow fatty acid and diethylenetriamine (amine number 2.6) were added dropwise to a solution of 305 g of copolymer 1 and 800 ml of xylene while stirring. This mixture was then heated to 145° C. while passing in a stream of nitrogen and was stirred for 9 hours under a water separator.

The product was isolated by distilling off xylene under reduced pressure. The acid number was 12.4 mg KOH/g and the amine number was 1.4 mmol of basic N/g.

Copolymer 2

1,082 g of diisobutene (isomer mixture of 80% of 2,4,4-trimethylpent-1-ene and 20% of 2,4,4-trimethylpent-2-ene) and 49 g of MA were introduced into the stainless steel reactor described above. Nitrogen under 6 bar was then forced into the tightly sealed reactor, the pressure was let down and nitrogen under 6 bar was forced in twice more. The reactor content was then heated to 160° C. while stirring. At this temperature, a further 931 g of MA were then added in the course of 2 hours and, simultaneously but separately therefrom, a solution of 63 g of di-tert-butyl peroxide in 150 g of diisobutene was added in the course of 3 hours. The reaction mixture was then stirred for a further hour at 160° C.

The unpolymerized diisobutene (246 g) was distilled off at 100 mbar. The remaining clear golden yellow melt was poured onto a metal sheet for cooling.

The average molecular weight of the resulting brittle resin was 3,000 g/mol.

Copolymer 2a

A solution of 13.5 g of stearylamine in 50 ml of dioxane was added dropwise to a solution of 105 g of copolymer 2 in 250 ml of dioxane at 80° C. Stirring was then carried out at this temperature for 4 hours, after which the acid number was 100 mg KOH/g. After the addition of 50 ml of water, stirring was continued for a further 4 hours at 100° C.

The product was isolated by distilling off the solvent at 15 mbar.

Copolymer 2b

Copolymer 2 was reacted with 3.7 g (0.05 mol) of n-butylamine by a method similar to the preparation of copolymer 2a.

Copolymer 3

The 1-$C_{12}$-$C_{14}$-olefin/MA copolymer was prepared similarly to the preparation of copolymer 1.

The average molecular weight of the resulting copolymer was 4,200 g/mol.

Copolymer 3a 30 g of lactic acid were added to 577 g of copolymer 3 at 90° C. while stirring. Stirring was carried out for 20 hours at 90° C., after which 114 g of diisotridecylamine were added. Stirring was then continued for about a further 10 hours at this temperature, after which the acid number was 160 mg KOH/g.

Copolymer 4

The 1-$C_{12}$-olefin/MA copolymer was prepared similarly to the preparation of copolymer 1.

The average molecular weight of the resulting copolymer was 4,000 g/mol.

Copolymer 4a

A solution of 150 g of copolymer 4 in 400 ml of dioxane and 100 ml of water were stirred for 20 hours at 100° C., after which the acid number was 220 mg KOH/g.

The product was isolated by distilling off the solvent under reduced pressure.

Copolymer 5

The 1-$C_{30}$-olefin/MA copolymer was prepared similarly to the preparation of copolymer 1.

The average molecular weight of the resulting copolymer was 6,800 g/mol.

Copolymer 5a 13.5 g of lactic acid were added to 155.2 g of copolymer 5 at 95° C. while stirring. Stirring was then continued for a further 20 hours at this temperature, after which the acid number was 10.4 mg KOH/g.

Copolymer 5b

A mixture of 155.2 g of copolymer 5 and 4.5 g of phenylglycine was stirred at 160° C. for 20 hours, after which the acid number was 32 mg KOH/g.

2. Preparation of the pigment formulations

In the manner described above, pigments 1 to 3 were coated with assistants (c), and pigment 4 additionally with a copolymer (b).

Pigment 1

100 g of the copper phthalocyanine prepared according to Example 2 of DE-A-28 51 752, in the form of the aqueous presscake, was suspended in 2 l of water. Stirring was carried out for 2 hours at room temperature, after which 5 g of CuPc-monosulfonic acid in the form of the aqueous presscake obtained in the preparation were added. The pH was brought to 9 by adding 10% strength by weight sodium hydroxide solution. After stirring had been carried out for a further 10 minutes, a solution of 6.0 g of tallow fatty 1,3-diaminopropane in 30 ml of ethylene glycol monobutyl ether was added. Stirring was then continued for a further hour. The pigment coated in this manner was isolated by filtration, dried and milled.

Pigment 2

100 g of copper phthalocyanine of the β-modification (prepared in a known manner by salt milling; cf. Ullmanns Enzyklopädie der technischen Chemie, 4th Edition, Volume 18, (1979) page 512), in the form of the aqueous presscake, was suspended together with 2.5 g of CuPc-monosulfonic acid, likewise in the form of the aqueous presscake, in 1 l of water in the course of 3 hours at 60° C. After stirring had been carried out for 40 minutes, the pigment coated in this manner was filtered off, dried and milled.

Pigment 3

C.I. Pigment Red 57: 1 (laked BON acid pigment) was coated with 15% by weight of a rosin calcium salt in a generally known manner.

Pigment 4

94.5 g of copper phthalocyanine of the β-modification (prepared in a known manner by salt milling, cf. Pigment 2), in the form of the aqueous presscake, were dispersed together with 2.0 g of the CuPc-monosulfonic acid, likewise in the form of the aqueous presscake, in 1,200 ml of water at 60° C. in the course of 1 hour. After the addition of a solution of 1.0 g of tallow fatty 1,3-diaminopropane in 50 ml of 1% strength by weight acetic acid, the mixture was stirred for a further 2 hours at 60° C. A solution of 4.0 g of copolymer (b) in 50 ml of ethyleneglycol monobutyl ether was then added. The suspension was then stirred for a further hour at 60° C. The pH was then brought to 7.5 by adding 10% strength by weight sodium hydroxide solution. Stirring was carried out for a further hour, after which the pigment coated in this manner was isolated by filtration, dried and milled.

The compositions of the pigment formulations and of the mineral oil pastes prepared according to A. 1.1 and offset printing inks prepared according to A. 2.1 are summarized in Table 1.

The compositions of the comparative formulations which contain a polyester (comparisons 1 and 2) prepared according to DE-A-21 62 484, Example Polyester A, instead of the novel copolymer (b), or the pigment 3 coated only with Ca resinate (comparison 3) or the uncoated pigment 4 (comparison 4).

and 4 and determined according to A. 1.2 and A. 2.2, respectively.

Results of the investigation of mineral oil pastes by the circle method (according to A. 1.2)

| Examples | Circle diameter [mm] at load of | | | |
|---|---|---|---|---|
|  | 31.25 g | 250 g | 500 | 1000 g |
| 1 | 40 | — | — | — |
| 2 | 40 | — | — | — |
| 3 | 40 | — | — | — |
| 4 | 40 | — | — | — |
| 5 | 28 | 38 | 40 | — |
| 6 | 26 | 32 | 38 | 40 |
| 7 | 26 | 36 | 40 | — |
| 8 | 40 | — | — | — |
| 9 | 40 | — | — | — |
| 10 | 40 | — | — | — |
| 11 | 40 | — | — | — |
| Comp. 1 | 22 | 32 | 36 | 40 |
| 12 | 36 | 40 | — | — |
| 13 | 24 | 34 | 38 | 40 |
| 14 | 26 | 36 | 40 | — |
| 15 | 24 | 36 | 40 | — |
| Comp. 2 | 22 | 30 | 34 | 36 |
| 16 | 20 | 22 | 28 | 32 |
| Comp. 3 | 20 | 20 | 20 | 20 |
| 17 | 24 | 32 | 34 | 40 |
| Comp. 4 | 20 | 26 | 28 | 32 |

TABLE 3

Flow sheet values of the offset printing inks without storage (A. 2.2)

| Examples | Running time [sec] to reach rating | | | |
|---|---|---|---|---|
|  | 2 | 3 | 4 | 5 |
| 1 | 12 | 40 | 120 | 230 |
| 2 | 13 | 50 | 150 | 690 |
| 3 | 20 | 90 | 360 | — |
| 4 | 18 | 65 | 180 | 660 |
| 5 | 8 | 33 | 80 | 180 |
| 6 | 15 | 65 | 280 | 840 |
| 7 | 17 | 80 | 210 | 1380 |
| 8 | 14 | 45 | 120 | 335 |
| 9 | 15 | 53 | 125 | 330 |
| 10 | 11 | 35 | 75 | 205 |
| 11 | 9 | 33 | 87 | 255 |
| Comp. 1 | 15 | 75 | 600 | — |

TABLE 1

Composition of the pigment formulations, mineral oil pastes and offset printing inks

| Examples | Pigment formulation | | Mineral oil paste | | | Offset printing inks |
|---|---|---|---|---|---|---|
|  | Pigment (a') (coated) | Copolymer (b) | x g (a') | y g (b) | z g Mineral oil PKWF 6/9 | Pigment content of |
| 1 | 1 | 1 | 19.4 | 0.6 | 30 | 18% |
| 2 | 1 | 1a | 19.4 | 0.6 | 30 | 18%. |
| 3 | 1 | 1c | 19.4 | 0.6 | 30 | 18% |
| 4 | 1 | 1d | 19.4 | 0.6 | 30 | 18% |
| 5 | 1 | 1e | 19.4 | 0.6 | 30 | 18% |
| 6 | 1 | 2a | 19.4 | 0.6 | 30 | 18% |
| 7 | 1 | 2b | 19.4 | 0.6 | 30 | 18% |
| 8 | 1 | 3a | 19.4 | 0.6 | 30 | 18% |
| 9 | 1 | 1f | 19.4 | 0.6 | 30 | 18% |
| 10 | 1 | 4a | 19.4 | 0.6 | 30 | 18% |
| 11 | 1 | 1g | 19.4 | 0.6 | 30 | 18% |
| Comp. 1 | 1 | [Polyester A][1] | 19.4 | 0.6 | 30 | 18% |
| 12[2] | 2 | 1 | 23.75 | 1.0 | 25 | 30% |
| 13[2] | 2 | 5a | 23.75 | 1.0 | 25 | 30% |
| 14[2] | 2 | 1b | 23.75 | 1.0 | 25 | 30% |
| 15[2] | 2 | 5b | 23.75 | 1.0 | 25 | 30% |
| Comp. 2[2] | 2 | [Polyester A][1] | 23.75 | 1.0 | 25 | 30% |
| 16 | 3 | 1 | 23.0 | 2.0 | 25 | 30% |
| Comp. 3 | 3 | — | 23.0 | — | 25 | 30% |
| 17 | 4 | 1h | 20.0 | — | 30 | 30% |
| Comp. 4[3] | 4 | — | 20.0 | — | 30 | 30% |

[1] cf. DE-A-21 62 484
[2] In the preparation of the mineral oil paste, 0.25 g of tallow fatty 1,3-diaminopropane was also added in each case
[3] Uncoated The novel offset printing inks have the same color strength and the same transparency (determined according to A. 2.2) as the corresponding comparative printing inks.

Regarding the theological properties, the novel mineral oil pastes and offset printing inks are clearly superior to the comparative formulations, as demonstrated by the measured values shown in Table 2 or Tables 3

TABLE 3-continued

Flow sheet values of the offset printing inks without storage (A. 2.2)

| Examples | Running time [sec] to reach rating | | | |
|---|---|---|---|---|
| | 2 | 3 | 4 | 5 |
| 12 | 170 | 1148 | — | — |
| 13 | 150 | 600 | — | — |
| 14 | 100 | 700 | — | — |
| 15 | 50 | 170 | 395 | 1090 |
| Comp. 2 | 120 | — | — | — |
| 16 | 115 | 385 | 880 | — |
| Comp. 3 | does not flow | | | |
| 17 | 45 | 168 | 450 | 1105 |
| Comp. 4 | 180 | — | — | — |

TABLE 4

Flow sheet values of the offset printing inks after storage for 30 minutes according to (A 2.2)

| Examples | Rating after running time of | | |
|---|---|---|---|
| | 5 min | 10 min | 30 min |
| 1 | 1.8 | 3.4 | 5 |
| 2 | 1.4 | 1.4 | 1.8 |
| 3 | 1.4 | 1.5 | 1.9 |
| 4 | 1.3 | 1.4 | 1.9 |
| 5 | 1.7 | 2.1 | 3.7 |
| 6 | 1.6 | 1.8 | 2.5 |
| 7 | 1.8 | 2.1 | 3.3 |
| 8 | 1.5 | 1.8 | 2.3 |
| 9 | 1.4 | 2.0 | 3.3 |
| 10 | 1.4 | 2.1 | 3.3 |
| 11 | 1.5 | 2.1 | 3.3 |
| Comparison 1 | 1.3 | 1.5 | 1.8 |
| 12 | 1.2 | 1.5 | 1.8 |
| 13 | 1.1 | 1.3 | 1.6 |
| 14 | 1.1 | 1.2 | 1.5 |
| 15 | 1.2 | 1.6 | 2.3 |
| Comparison 2 | 1 | 1 | 1 |
| 16 | 1.8 | 2.2 | 3.5 |
| Comparison 3 | does not flow | | |
| 17 | 1 | 1.5 | 2.5 |
| Comparison 4 | 1 | 1 | 1 |

We claim:

1. A process for the preparation of pastes, printing inks or coatings, comprising
   (a) selecting at least one finely divided pigment,
   (b) mixing with said finely divided pigment at least one thermoplastic copolymer obtainable by free radical polymerization of
      ($\alpha_1$) $C_8$–$C_{40}$-monoolefins or
      ($\alpha_2$) $C_8$–$C_{40}$-alkyl vinyl ethers or
      ($\alpha_3$) a mixture of $C_8$–$C_{40}$-alkyl vinyl ethers and up to 50 mol % of $C_8$–$C_{40}$-monoolefins with
      ($\beta$) monoethylenically unsaturated $C_4$–$C_{12}$-dicarboxylic acids or $C_4$–$C_{12}$-dicarboxylic anhydrides and having a weight average molecular weight of from 500 to 20,000 g/mol, some or all of whose carboxyl or anhydride groups may be reacted with ammonia, amines, alcohols, amino- or hydroxycarboxylic acids or alkali metal or alkaline earth metal hydroxides, and
   (c) if required, further assistants conventionally used in pigment formulations,
wherein the thermoplastic copolymer (b) is present in an amount of from 1 to 30% by weight based on the pigment (a).

2. A paste, printing ink or coating containing a pigment formulation prepared by the process of claim 1.

3. A pigment formulation containing
   (a) at least one finely divided pigment,
   (b') at least one copolymer obtainable by free radical polymerization of
      ($\alpha_1'$) $C_{18}$–$C_{40}$-monoolefins or
      ($\alpha_2$) $C_8$–$C_{40}$-alkyl vinyl ethers or
      ($\alpha_3$) a mixture of $C_8$–$C_{40}$-alkyl vinyl ethers and up to 50 mol % of $C_8$–$C_{40}$-monoolefins with
      ($\beta$) monoethylenically unsaturated $C_4$–$C_{12}$-dicarboxylic acids or $C_4$–$C_{12}$-dicarboxylic anhydrides and having a molecular weight of from 500 to 12,000 g/mol, some or all of whose carboxyl or anhydride groups are reacted with ammonia, amines, amino- or hydroxycarboxylic acids or alkali metal or alkaline earth metal hydroxides, and
   (c) if required, further assistants conventionally used in pigment formulations.

4. A pigment formulation as claimed in claim 3, which contains from 1 to 30% by weight of (b'), based on (a).

* * * * *